United States Patent [19]
Ringler et al.

[11] 3,816,800
[45] June 11, 1974

[54] PROTECTIVE SYSTEM FOR SERIES CAPACITORS

[75] Inventors: Tim N. Ringler; James N. Santilli, both of Bloomington, Ind.

[73] Assignee: Westinghouse Electric Corporation, Pittsburgh, Pa.

[22] Filed: Mar. 1, 1973

[21] Appl. No.: 337,243

[52] U.S. Cl. ............ 317/12 A, 317/12 R, 200/82 B
[51] Int. Cl. ........................................... H02h 7/16
[58] Field of Search ............ 317/12 A, 59; 251/94; 200/82 B

[56] References Cited
UNITED STATES PATENTS

| | | | |
|---|---|---|---|
| 2,584,710 | 2/1952 | Johnson | 317/12 A |
| 3,047,697 | 7/1967 | Forwald | 200/82 B |
| 3,116,381 | 12/1963 | Irik | 200/82 B |
| 3,646,292 | 2/1972 | Barkan | 200/82 B |
| 3,707,650 | 12/1972 | Innis | 317/36 TD |

Primary Examiner—J. D. Miller
Assistant Examiner—Patrick R. Salce
Attorney, Agent, or Firm—G. H. Telfer

[57] ABSTRACT

A protective system for series capacitors including a bypass switch device having pneumatic latching means to normally hold the switch in open position, with an improved pneumatic control system for effecting release of the bypass switch under predetermined conditions.

8 Claims, 1 Drawing Figure

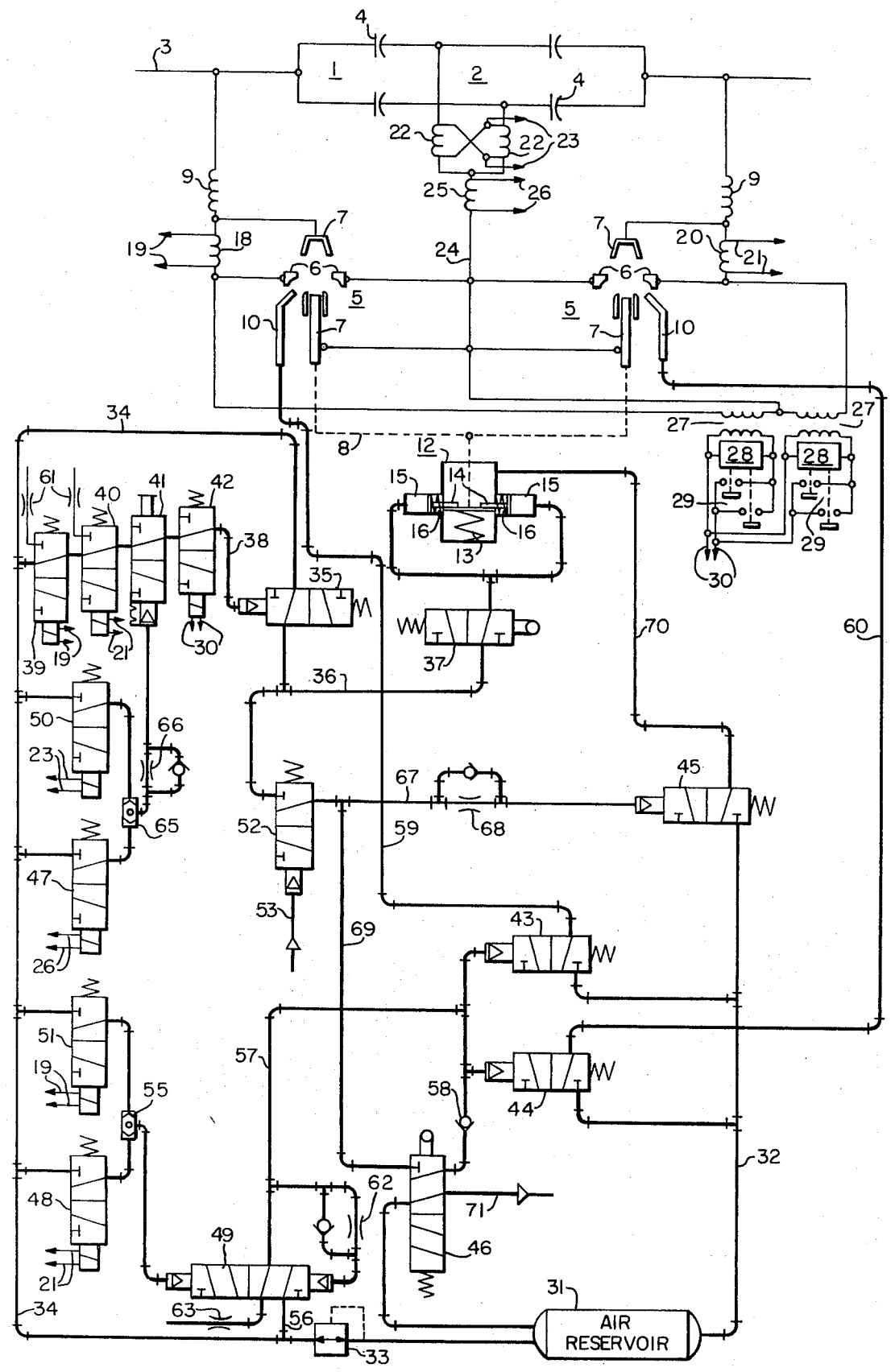

PROTECTIVE SYSTEM FOR SERIES CAPACITORS

BACKGROUND OF THE INVENTION

The present invention relates generally to series capacitor installations, and more particularly to a pneumatic latching means for a switch device, such as a bypass switch, and to an improved pneumatic control system for such a switch. The new latch means is not necessarily limited in its application but it is especially suitable for use with a bypass switch in series capacitor installations.

Capacitor banks are connected in series in high voltage transmission lines to compensate a desired part of the inductance of the line in order to raise the stability limit, or to control the load division between parallel lines, or for other purposes. Since such capacitors are in series in the line they are subject to dangerous overvoltages in case of a fault on the line, or other excess current conditions such as may result from switching surges. Protection against such overvoltages must be substantially instantaneous and for this reason series capacitors are usually protected by spark gaps connected across the capacitor bank or across individual series segments of the bank so that the protective gaps arc over and bypass the capacitors substantially instantaneously upon the occurrence of a predetermined overvoltage. A bypass switch is usually provided in parallel with each gap for backup protection, and for bypassing the capacitor in response to other abnormal conditions or to permit inspection and maintenance of the capacitors. The bypass switch is biased to the closed position but is normally held open and is released to move to the closed position in response to the occurrence of predetermined abnormal or undesirable conditions.

Protective systems of this general type are well known. The early series capacitor installations utilized spring biased bypass switches which were held open by air pressure in a pneumatic cylinder directly connected to the switch, and electro-pneumatic control systems were used to exhaust the air from the cylinder and permit the switch to close in response to predetermined conditions. Systems of this type are shown in Marbury U.S. Pat. Nos. 2,576,132 and Johnson 2,584,710. These early systems operated successfully but the controls were complicated, requiring special valves and much interconnecting piping, and it was found to be difficult to exhaust or dump the air from the pneumatic cylinder as rapidly as desired or with the desired consistency between successive operations.

More recent series capacitor installations, therefore, have utilized mechanically latched switches with electrical control systems for releasing the latch to permit the switch to close in response to predetermined conditions, as shown in Cuttino U.S. Pat. Nos. 3,335,362 and Marbury 3,385,941. These systems have also been satisfactory in operation but the mechanical latches used involved complicated mechanical linkages which were expensive and difficult to adjust, and the control system could not readily be made fail safe in case of the loss of the air pressure needed for current interruption in the switches and protective gaps.

SUMMARY OF THE INVENTION

In accordance with the present invention a latching means is provided for a switching device which is simple and low in cost but highly reliable. The switch is operated by means of a pneumatic cylinder which actuates the switch to either open or closed position against the force of a spring which biases the switch to the other position. The switch can be of any type and arranged to be biased to either position depending upon its intended use. The switch is latched in the actuated position by one or more, preferably two, latch cylinders which actuate latch members positioned to engage the actuating means of the switch to hold it in the actuated position. The latch members are movable in the latch cylinders between the latching position and a retracted position in which the switch is released, and they are biased into one position and actuated to the other position by air pressure applied to the latch cylinders. The latch members can be arranged to be biased to either position and actuated to the other position by air pressure. In this way a very simple and reliable latching means is provided which positively holds the switch in the desired position but is quickly and reliably released merely by releasing the air pressure in the latching cylinders.

This latching means is particularly well adapted for series capacitor protective systems. A bypass switch is biased to the closed position and is normally held open by latch members which are arranged to be biased to the retracted position and held in the latching position by air pressure. Thus a simple and reliable latching means is provided and the switch can be released to move to closed position simply by releasing the air pressure in the latch cylinders. This system is also inherently fail safe since the latches are released to permit the bypass switch to close in case of loss of air pressure. This arrangement lends itself to a relatively simple pneumatic control system utilizing standard valves arranged to respond to various predetermined conditions to effect release of the bypass switch. A protective system is thus provided which is highly reliable and relatively low in cost.

BRIEF DESCRIPTION OF THE DRAWING

The invention will be more fully understood from the following detailed description of an illustrative embodiment, taken in connection with the accompanying drawing, the single FIGURE of which is a schematic diagram of a series capacitor installation embodying the invention.

DESCRIPTION OF PREFERRED EMBODIMENT

The invention is shown in the drawing embodied in a series capacitor installation consisting of two capacitor groups 1 and 2 connected in series in a high voltage transmission line 3. Only one phase of the line 3 is shown but it will be understood that each phase of the line contains an identical capacitor bank with its associated protective equipment. Each of the groups 1 and 2 consists of a suitable number of individual capacitors or capacitor combinations 4 suitably connected in parallel or series-parallel. It will be understood that such capacitor banks normally consist of a relatively large number of individual capacitor units, and the term "capacitor" as used herein includes capacitor banks having any number of suitably connected individual capacitor units or any combination of capacitor units connected together, as well as the individual units.

Each of the capacitor groups 1 and 2 of the installation is protected by a combined spark gap and bypass switch device 5 of the type disclosed in the above-mentioned Marbury U.S. Pat. No. 3,385,941. As more fully described in that patent, each of these devices has fixed electrodes 6 constituting a protective spark gap device and has fixed and movable switch contacts 7 actuated by a common operating mechanism diagrammatically indicated at 8. The gap electrodes 6 of each of the devices 5 are connected, as shown, across the corresponding capacitor group in series with a current limiting reactor 9. The switch contacts 7 of each of the devices 5 are connected to bypass both the capacitor group and the protective gap when the switch contacts are closed. An air blast is provided for current interruption in each of the devices 5 through a suitable conduit and nozzle indicated at 10.

The common actuating mechanism 8 of the two switch devices 5 is actuated by means of a pneumatic cylinder 12. The operating mechanism 8 itself has been indicated only diagrammatically and may be of the type described in the above-mentioned Marbury patent, or may be any other suitable mechanical operating mechanism for actuating the switch contacts and which is capable of being operated by the pneumatic cylinder 12. The cylinder 12 contains a piston which is connected to the actuating mechanism 8, as indicated diagrammatically by the dotted connection and which is biased by a spring 13 to the closed position of the switch contacts 7. Normally, however, the switch is held in the open position by latch member 14 and movable in latch cylinder 15 to such cylinders being shown although more or less than two cylinders could be utilized. The latch members 14 are biased by means of springs 16 to the retracted position in which they are withdrawn from the cylinder 12, but are normally held in the latching position shown in the drawing by air pressure in the cylinders 15. Upon release of air pressure in the cylinders 15, the latches 14 move to the retracted position permitting the switch contacts 7 to close under the action of the biasing spring 13.

It will be understood that, in general, the latching mechanism described may be applied to any type of switch or circuit interrupter and may be arranged in any desired manner. That is, the switch contacts may be biased to either open or closed position, depending on the intended application of the switch, and the latch members may similarly be biased either to the latched position or the retracted position. A latching means is therefore provided which is quite flexible in application and which is simple and easily adjusted and controlled, as well as being highly reliable and inherently fail safe since loss of air pressure results in release of the switch. This latching mechanism is especially well adapted for series capacitor protection as disclosed herein.

As indicated above, the switches 7 are normally held open but are permitted to close in response to various predetermined conditions of the series capacitor installation, and sensing means are provided to detect these conditions and effect operation of the control system. To protect the capacitors 4 against overvoltages the gap electrodes 6 of each of the devices 5 are set to arc over and bypass the corresponding capacitor group at a predetermined overvoltage. This condition is detected by means of current transformers 18 and 20 in the gap circuits. Upon arcing over of either protective gap, current flows in the gap circuit and the current transformer 18 or 20 provides a continuous signal on its output leads 19 or 21. Two cross-connected current transformers 22 are provided in the paralleling connection between the capacitor groups 1 and 2 to detect unbalance in either of the capacitor groups such as may be caused by blowing of a predetermined number of individual capacitor unit fuses, for example. Upon occurrence of such an unbalance, a signal is derived from the transformers 22 which appears on the output leads 23. Another possible abnormal condition for which protection is desirable is a flashover across the insulators supporting the protective apparatus which is usually housed in an insulated cabinet, and in this case the capacitor must be bypassed and protected. For this purpose a current transformer 25 is provided in the conductor 24 to provide an output signal on the leads 26 in response to current flow in the conductor 24 which results from a ground fault such as an insulator flashover.

Protection is also provided against overloads and overheating of the capacitors due to high level, short time overcurrents, or to lower sustained overcurrents which may cause overheating or other damage if allowed to continue. For this purpose, transformers 27 are connected across each of the capacitor groups 1 and 2 and replica relay devices generally indicated at 28 are connected to the transformers 27. The devices 28 are preferably of the type disclosed and claimed in a U.S. Pat. to Cuttino et al. No. 3,538,381. As described in that patent, each of the devices 28 has one set of contacts 29 which closes in response to a high level, short duration overcurrent, and has another set of contacts 29 which is actuated by the temperature of a replica device which reproduces the temperature of the actual capacitor units. The contacts 29 of each of the devices 28 are connected in parallel so that closure of either of the contacts of either of the devices 28 provides an output signal on the leads 30.

As previously indicated, under normal conditions with the capacitor bank in service in the line, the switch contacts 7 are held in the open position shown in the drawing by the latch members 14 which are held in the latching position by air pressure in the latch cylinders 15. The present invention provides an improved and relatively simple pneumatic control system for controlling the operation of the switch devices 5 in response to signals received from the sensing means described above. The system is shown in the drawing with the various valves in their positions during normal operation and with the switch contacts 7 in their open position (the symbols used are those of the American National Standards Institute published as USAS Y32.10–1967).

Air for the operation of the system is supplied from an air reservoir 31. It will be understood that since the capacitor bank is in series in the line the capacitor bank and its associated equipment are at line potential and must be insulated from ground. Since the line 3 will normally be a high voltage transmission line, the capacitor bank and its protective equipment are usually mounted on a platform which is supported upon insulator columns at a considerable distance above ground level to provide the necessary insulation. The air reservoir 31 preferably is mounted on the platform to be closely adjacent the equipment which is to be operated and is supplied with air through an insulating conduit or hose from a compressor station at ground level. Preferably the air supply system may be similar to that described in the above-mentioned Cuttino U.S. Pat. No.

3,335,362 in which several air lines or conduits extend from ground level through an insulating air column to the insulated platform for supplying air under pressure to the reservoir 31 and for transmitting signals. Any suitable means for supplying air to the reservoir 31 to maintain the desired pressure may, however, be utilized if desired. The reservoir 31 supplies air directly through a conduit 32 for operation of the cylinder 12 and for air blasts through the nozzles 10 to the gap and switch devices 5. The reservoir 31 also supplies air for control purposes to actuate the various valves of the system, and for this purpose a pressure regulator 33 is connected to the reservoir to supply air at a lower pressure through a control air conduit 34. Thus, for example, the air in the reservoir 31 may be maintained at a pressure of 135 psig while the control air supplied to the conduit 34 may be at a pressure of 90 psig.

In the normal condition shown in the drawing control air from the line 34 is permitted to flow through a valve 35 to a conduit 36, and through a valve 37 to the latch cylinders 15 to hold the latch members 14 in the latched position and thus hold the switches 7 open. The valve 35 is a pneumatically controlled valve which is shown in its actuated position in which air is permitted to flow from the control line 34 to the conduit 36. The valve 35 is held in this position by control air from the line 34 through a conduit 38. Air flowing to the conduit 38 is controlled by four valves consisting of two solenoid valves 39 and 40, a pneumatically operated valve 41 and a solenoid valve 42. These valves are shown in the drawing in their non-actuated positions and they are connected so that air flows from the control line 34 through the four valves in series to the conduit 38. The valves 39, 40, 41 and 42 are actuated in response to electrical signals as described hereinafter.

High pressure air for operation of the cylinder 12 and for providing air blasts to the protective devices 5 is supplied from the reservoir 31 to the conduit 32. The air blasts to the two devices 5 are controlled by pneumatically actuated valves 43 and 44, and air for operation of the cylinder 12 is controlled by a pneumatic valve 45. The air blast valves 43 and 44 are controlled by a valve 46 which is shown in its actuated position in which control air to the valves 43 and 44 is shut off. The valves 37 and 46 are mechanically actuated valves which are actuated to the positions shown in the drawing by movement of the switch operating mechanism 8 to the open position. The valves return to nonactuated position when the switch is released and closes the contacts 7.

In addition to the valves 39, 40, 41 and 42 certain other valves are provided to effect operation of the bypass switches in response to signals from the capacitor bank. Thus solenoid valves 47 and 48 are connected to be actuated by signals from the current transformers 18 and 20, respectively, and control the air blast valves 43 and 44 through a valve 49. The valves 39 and 40 mentioned above also respond to signals from the current transformers 18 and 20 to provide protection in case of continued arcing in the gaps 6.

A solenoid valve 50 is connected to be actuated by signals from the current transformer leads 23 and another solenoid valve 51 is connected to be actuated from the current transformer 25 through the leads 26. These two valves control the valve 41 as more fully described below. In addition the solenoid valve 42 previously mentioned is connected to be actuated by signals from the leads 30 in response to operation of either of the relay devices 28. A control valve 52 is also provided and is actuated by air pressure applied through a conduit 53, which may be supplied with air from ground level, or otherwise, and controlled by any suitable remote valve or control such as that shown in the above mentioned U.S. Pat. No. 3,335,362. The valve 52 is utilized to effect opening of the bypass switch after it has been closed by operation of the control system.

As previously indicated, the system is normally in the condition shown in the drawing, with the switch contacts 7 in the open position and latched there, and with the various valves in the positions shown. If an overvoltage exceeding the predetermined permissible value occurs across either of the capacitor groups 1 or 2, the corresponding gap between electrodes 6 arcs over. Current therefore flows in the gap circuit and an output signal appears on the leads 19 or 21 of the corresponding current transformer. The corresponding solenoid valves 39 and 47, or 40 and 48, are thereupon energized and move to their actuated positions. Operation of either of the valves 47 and 48 to the actuated position permits air from the control line 34 to flow through a shuttle valve 55 to the valve 49 to move it to its actuated position. In this position, air flows from the control line 34 through a conduit 56 and a conduit 57 to the blast valves 43 and 44, a check valve 58 preventing flow of air beyond the blast valves. The valves 43 and 44 are thus moved to their actuated positions to permit high pressure air to flow from the conduit 32 to conduits 59 and 60, respectively, to supply an air blast to each of the switch and gap devices 5 to extinguish the arc in the gaps when the overvoltage has passed.

Either or both of the solenoid valves 39 or 40 are actuated simultaneously with the corresponding valves 47 and 48 as indicated above, and move to their actuated positions in which air flow from the control line 34 through conduit 38 to the valve 35 is connected to exhaust. The exhaust lines from the valves 39 and 40, however, contain orifices or restrictions 61 to throttle or restrict the flow of air so that a time delay is introduced in the exhaust of air from the valve 35. If the arcing between the gap electrodes 6 ceases within this time delay, and current ceases to flow in the gap circuit, the corresponding solenoid valves are deenergized and return to their nonactuated positions shown in the drawing. The return of the valves 47 and 48 to the nonactuated position cuts off control air from the valve 49. While the valve 49 is in its actuated position, air flows through an orifice 62 to the opposite end of the valve, 49 and when the air is cut off by the valves 47 or 48, the valve 49 is returned to its position shown in the drawing by air from conduit 57. Control air from the conduit 56 is then cut off and the blast valves 43 and 44 return to the nonactuated position shown to shut off the blast air from the conduits 59 and 60. Air exhausts from the valves 43 and 44 through a restriction or orifice 63 for a short time delay to insure that the blast continues for a short period after arcing has ceased to prevent any possibility of restricting.

If arcing in the gaps 6 is discontinued within the desired time, the system returns to its normal position as described above. If however arcing continues beyond the predetermined time, which could result in damage to the gap devices, the air exhausting from the valve 35 through either or both of the orifices 61 permits the valve 35 to move to its nonactuated position in which control air is exhausted from the conduit 36. This permits the latch cylinders 15 to be exhausted and results in immediate retraction of the latches 14. The bypass switches 7 are thereupon immediately closed by the bias spring 13 to shunt the gaps 6 and extinguish the arcs. Operation of the switches to the closed position effects mechanical actuation of the valves 37 and 46 to their nonactuated positions.

In case of unbalance of the capacitor bank due to blowing of fuses, or other reasons a signal occurs on the leads 23 as explained above and solenoid valve 50 is actuated. Similarly if a signal appears on the leads 26 in response to current flow in the conductor 24, solenoid valve 51 is actuated. Upon actuation of either or both of the valves 50 and 51, control air is admitted through a shuttle valve 65 to actuate the valve 41, a time delay preferably being introduced by flow through an orifice 66 to insure against operation on transient conditions. Actuation of the valve 41 interrupts the supply of control air to the valve 35 which thereupon moves to its nonactuated position to cause release and closing of the switch contacts 7 in the manner described above. Since operation of the valve 41 is caused by conditions which require inspection and maintenance before the capacitor can safely be returned to service, the valve 41 is controlled manually and does not return to its nonactuated position until manually reset.

The relay devices 28, as previously described, produce an output signal on leads 30 in response to over temperature conditions or high level, short duration overloads. Upon occurrence of any of these conditions, the solenoid valve 42 is actuated by the signal on leads 30 and moves to its actuated position in which control air is cut off from the valve 35 resulting in immediate closure of the bypass switches as described above.

Thus the operation of the system in response to any of the abnormal or undesirable conditions mentioned results in release of air pressure in the latch cylinders 15 to cause the latches to be retracted and permit immediate closure of the bypass switch contacts 7. When this occurs the valves 37 and 46 are moved to their nonactuated positions by mechanical actuation from the operating mechanism 8. After the abnormal condition has passed or been corrected, and the corresponding valves have returned to their positions shown in the drawing, the switches 7 can be reopened to restore the capacitor to service. This is accomplished by means of the valve 52. As indicated above, this valve is a pneumatic valve actuated by air pressure applied through the conduit 53. Upon actuation of the valve 52, if the valve 35 has been restored to the position shown in the drawing, control air flows from the line 34 through the valve 35 and the valve 52 to a conduit 67, and through an orifice or restriction 68 to the valve 45. Simultaneously, air flows through the valve 52 to the conduit 69. The valve 46 is now in its nonactuated position, the switch 7 being closed, and air from the conduit 69 flows through the valve 46 and the check valve 58 to the valves 43 and 44, moving them to actuated position to turn on the air blast in both switch devices 5. Air flowing through the conduit 67 actuates the valve 45 with a time delay sufficient to insure that the air blasts are first turned on, and when the valve 45 is actuated air flows from the conduit 32 to the conduit 70 and to the cylinder 12 to move the operating mechanism 8 to open the switch contacts 7. When the operating mechanism 8 has reached its full open position, the valves 37 and 46 are mechanically actuated to their positions shown in the drawing. In this position air is permitted to flow from the conduit 36 through the valve 37 to the latch cylinders 15 and moves the latches 14 to the latching position in which they engage the switch operating mechanism to hold the switch in open position. Actuation of the valve 46 shuts off the air supply to the valves 43 and 44 permitting them to return to their nonactuated position and shutting off the air blasts. Air exhausts from the blast valves 43 and 44 through the conduit 57 and the valve 49, and the exhaust orifice 63 to delay operation of the valves 43 and 44 sufficiently to insure that the air blast is not shut off until the switches 7 are fully open and latched in the open position. Operation of the valve 46 may also be utilized to turn the air off and on in a signal line 71 which may extend to ground level to actuate an indicator or signal showing the open and closed positions of the switches 7.

It will be apparent that other protective functions can readily be added to the system if desired. For example, a valve responding directly to air pressure in the reservoir 31 could be added in series with valves 39, 40, 41 and 42 to effect closing of the switches 7 if the air pressure should drop below a desired minimum level. It should be noted, however, that the system is inherently fail-safe since loss of air pressure for any reason will result in immediate retraction of the latches 14 and closure of the switches 7. It will also be noted that the system is "trip free." That is, the switches 7 cannot be reopened after operation if any condition exists which would cause closing of the switches since the valve 35 would then remain in its nonactuated position and shut off the flow of control air.

What I claim is:

1. In a series capacitor installation having a capacitor adapted to be connected in series in an alternating current line, a protective spark gap device and bypass switch means connected across said capacitor, control means for said bypass switch including a pneumatic cylinder for actuating the switch, first spring means for biasing the switch to closed position, valve means for admitting air to said cylinder to actuate the switch to open position, pneumatic latch means for latching the switch in open position, said latch means being actuated to latching position in response to movement of the switch to open position, and means responsive to predetermined conditions of said installation for effecting operation of the latch means to release the switch to move to closed position.

2. The combination of claim 1 in which said pneumatic latch means comprises at least one latch cylinder, a latch member movable in said latch cylinder to and from latching position, second spring means for biasing the latch member in one direction of movement, and means for admitting air to the latch cylinder to effect movement of the latch member in the opposite direction.

3. The combination of claim 2 in which said second spring means biases the latch member to the release position, and the latch member is moved to the latching position by air pressure.

4. In combination, a switch device having a movable contact, actuating means for said movable contact, a pneumatic cylinder, said actuating means including an actuating member movable in said cylinder, first spring means biasing said actuating member in one direction, means for admitting air to said cylinder to move the actuating member in the opposite direction, latching means for said actuating member comprising at least one latch cylinder and a latch member movable in the latch cylinder between latching and released positions and adapted to engage the actuating member in the latched position, second spring means biasing said latch member to one of said positions, means for admitting air to the latch cylinder to move the latch to the other of said positions, and means actuated in response to movement of said actuating member for admitting air to the latch cylinder when the actuating member reaches a predetermined position.

5. The combination of claim 4 in which the spring means biases the latch member to the released position and air pressure admitted to the latch cylinder moves the latch member to the latching position and holds it in latching position.

6. A series capacitor installation comprising a capacitor bank adapted to be connected in series in an alternating current transmission line, a combined protective spark gap device and bypass switch means connected across said capacitor, first spring means biasing said switch means to closed position, a pneumatic cylinder for actuating said switch means to open position, latching means including at least one latch cylinder, a latch member movable in the latch cylinder to latching position to latch the switch means in open position, second spring means biasing the latch member to released position to release the switch means, means for supplying an air blast to said gap device and bypass switch means, valve means for admitting air to said pneumatic cylinder to actuate the switch means to open position and for applying said air blast, means responsive to actuation of the switch means to open position for admitting air to said latch cylinder to latch the switch means and for shutting off the air blast, and means responsive to predetermined conditions of the series capacitor installation for effecting exhaust of air from said latch cylinder to permit the latch member to move to released position to release the switch means to move to closed position.

7. A series capacitor installation as defined in claim 6 and including means responsive to current flow through said gap devices for applying said air blast and for effecting exhaust of air from the latch cylinder after a predetermined time delay.

8. A series capacitor installation as defined in claim 6 in which said predetermined conditions of the installation include overvoltage across the capacitor for more than a predetermined time, overtemperature of the capacitor, and electrical unbalance of the capacitor.

* * * * *